(12) United States Patent
Priesca

(10) Patent No.: US 6,576,903 B2
(45) Date of Patent: Jun. 10, 2003

(54) INFRARED DETECTOR WITH FEEDBACK

(75) Inventor: Jaime Quintana Priesca, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 09/872,225

(22) Filed: May 31, 2001

(65) Prior Publication Data

US 2002/0179836 A1 Dec. 5, 2002

(51) Int. Cl.$^7$ .................................................. G01J 5/00
(52) U.S. Cl. .................................. 250/338.1; 250/336.1
(58) Field of Search ........................... 250/338.1, 208.1, 250/336.1, 200

(56) References Cited

U.S. PATENT DOCUMENTS

| | | | | |
|---|---|---|---|---|
| 3,927,383 A | * | 12/1975 | Fjarlie et al. | ................... 330/59 |
| 5,144,133 A | * | 9/1992 | Dudley et al. | ........... 250/208.1 |
| 5,237,663 A | * | 8/1993 | Srinivasan | ................... 710/305 |
| 2002/0041382 A1 | * | 4/2002 | Iwasaki et al. | ............... 358/1.6 |

* cited by examiner

Primary Examiner—David Porta
Assistant Examiner—Christine Sung

(57) ABSTRACT

An infrared detector employing infrared element control circuit wherein the effect of external light on the sensitivity of the infrared element itself is reduced by approximately 80% by the use of a biased feedback loop.

8 Claims, 2 Drawing Sheets

INFRARED DETECTOR WITH FEEDBACK

FIELD OF THE INVENTION

The present invention relates generally to infrared sensors and, more particularly to an infrared detector circuit providing feedback for improving sensitivity of the infrared sensing function in high ambient light operating environments.

BACKGROUND OF THE INVENTION

Infrared sensors are known in the state of the art, finding many uses, including remote digital data transmission. For example, with the proliferation of portable computer apparatus, the use of infrared data communication between computers and between computers and computer peripherals has become common. The technique is particularly useful in what are now called notebook computers and palmtop personal digital assistants (PDA's) where portability and ease of use are paramount. For example, rather than adding cables to the baggage that accompanies a typical user of a notebook computer and portable printer, it is preferable to use infrared data communication techniques for printing a document from the computer. Similarly, infrared data communications ports are being added to many desktop equipments to facilitate their accessibility by the user of a notebook computer. To that end, original equipment manufacturers (OEM) such as Hewlett-Packard Company (the assignee of the present invention), IBM Corporation, and Apple Computer, Inc., have associated to form the Infrared Data Association to standardize such communications. The Serial Infrared Link Access Protocol (IRLAP), Draft Version 5.1 (Apr. 28, 1994) has been generated by this Association.

In FIG. 1 (Prior Art), an exemplary computer peripheral, such as an HP™ LaserJet™ printer 101, is shown to have a serial infrared data communication port 103 as would be known in the art where it would receive data to be output in hard copy. In general, the invention can be implemented in any machine such as a computer, portable computer, PDA, computer peripheral, portable printer, test instrument, or the like, which will have occasion to interface with another machine by infrared link for the purpose of transferring data. The printer 101 will serve as an example, but no limitation on the scope of the invention is intended nor should any be implied. An infrared link status indicator 105 is positioned for design convenience where the user can determine that the link with his portable computer (not shown) has been established (e.g., when an indicator 105 light goes from red to green).

Infrared light is, of course, invisible to the naked eye. Generally, for an infrared data link to be established, each equipment involved must have a clear line-of-sight between their respective infrared ports. A major problem is that most computers are used in daylight or office lighting conditions. External, ambient light will reduce the infrared signal response of the receiver element. For example, as demonstrated by FIG. 2, an IR transmitter 201 sends infrared digital pulses 203 to an IR receiver port 103. In substantially total darkness, the HIGH-LOW IR signals may appear at the IR receiver port 103, as illustrated by FIG. 2A. However, in a high ambient light condition, e.g., outdoors on in the direct sunshine, the same IR receiver 103 may have a signal approaching or exceeding saturation and no data is transferred, as demonstrated by FIG. 2B. In other words, the receiver 103 can not discriminate enough of the IR pulses transmitted when ambient light exceeds some threshold for the specific receiver element's operational design specifications.

There is a need for improving infrared signal control to solve said problem.

SUMMARY OF THE INVENTION

In a basic aspect the present invention provides an infrared signal detector including: an infrared sensor; a power source Vcc for activating the sensor, including a bias resistor; and a feedback loop coupled to said sensor, including a feedback bias resistor wherein the feedback bias resistor has a resistance approximately 1000 times greater than said bias resistor.

In another aspect, the present invention provides an apparatus having an infrared input port wherein the port further includes an infrared signal detector including an infrared sensor, a power source Vcc for activating the sensor, including a bias resistor, and a feedback loop coupled to said sensor, the loop including a feedback bias resistor wherein the feedback bias resistor has a resistance approximately 10000 times greater than said bias resistor.

In another aspect, the present invention provides a method for controlling sensitivity of an infrared sensor, said sensor including a biased power source Vcc, the method including: biasing the power source with a first resistor having a predetermined first resistance; and providing feedback to said sensor via a second resistor having a predetermined second resistance wherein a ratio second resistance:first resistance is approximately 10000:1.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings. The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventor for practicing the invention. Alternative embodiments are also briefly described as applicable.

Figure 3:
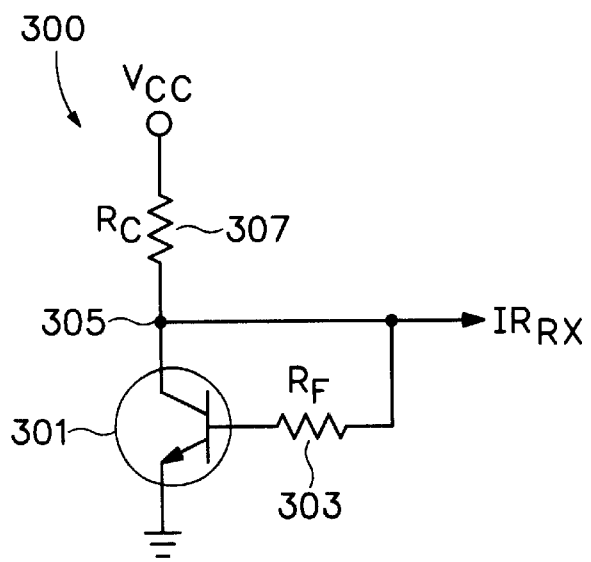
FIG. 3 is a circuit diagram in accordance with the present invention.

Turning now to FIG. 3, an infrared detector circuit 300 in accordance with the present invention is schematically illustrated. The infrared element 301 is an opto-transistor as would be known in the state of the art. Such elements are commercially available, such as the model BPX43 manufactured by Telefunken of Frankfurt, Germany.

A feedback resistor ("$R_F$") 303 is connected between the base of the infrared element 301 and the output node 305 for the received infrared signal ("$IR_{RX}$"). The feedback resistor 303 has a much greater resistance ($R_F$>>$R_C$) than a power supply ("$V_{CC}$") bias resistor 307 ("$R_C$") employed in the circuit, namely by a factor of at least 10,000. The exact resistance will naturally be a function of the specific infrared element 301 operating characteristics in any design implementation.

Figure 1:
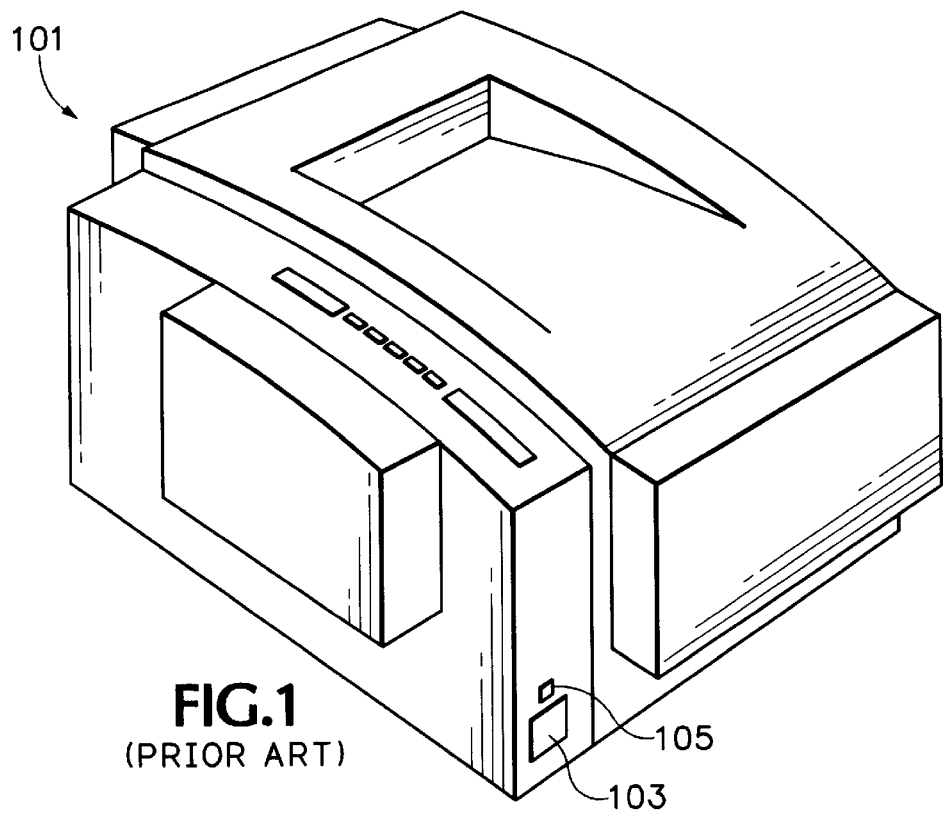
FIG. 1 (Prior Art) is a schematic drawing (perspective view) of a computer printer adapted to be configured as an exemplary embodiment in accordance with the present invention.
Figure 2:
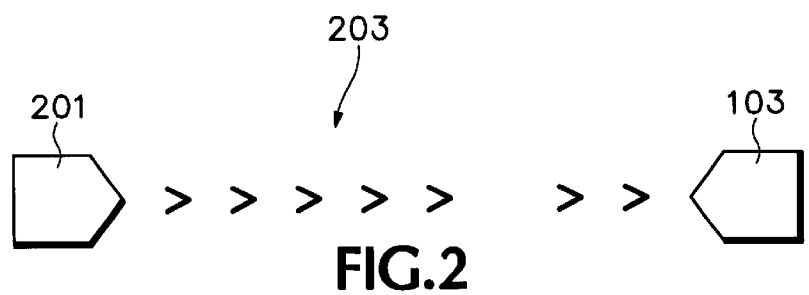
FIGS. 2, 2A and 2B demonstrate a problem associated with prior art devices.
Figure 2A:
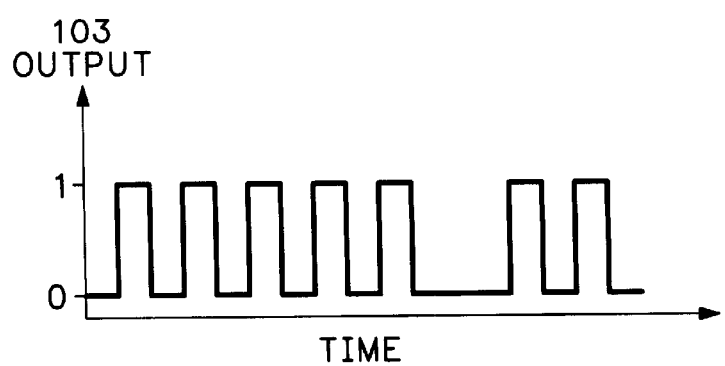
Figure 2B:
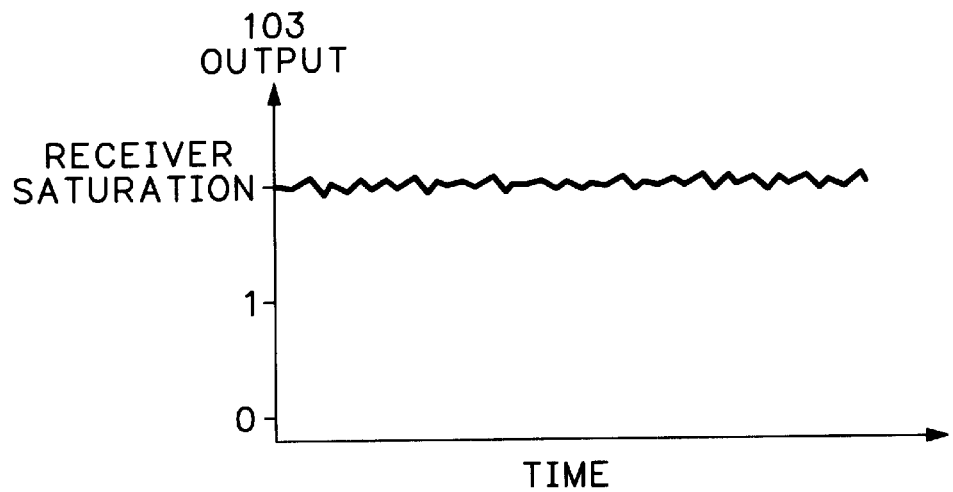
Figure 3A:
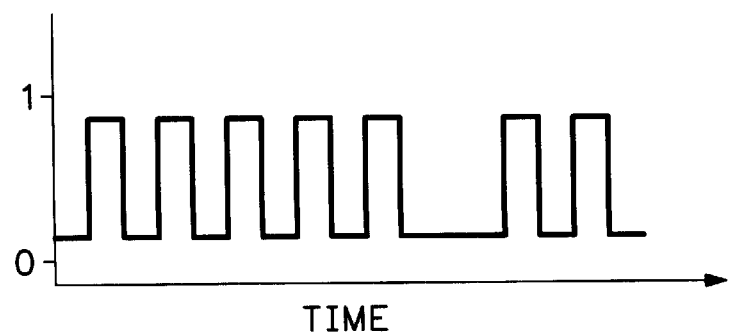
FIG. 3A is an IR receiver response chart showing improvements provided in accordance with the present invention as shown in FIG. 3 when compared to FIGS. 2A and 2B.

With the feedback resistor 303, it has been found that even in high ambient light environments the effect on the infrared element 301 is reduced by approximately eighty percent (80%). A saturation mode such as demonstrated by FIG. 2B, where there is no effective receiving infrared signal strength, does not occur. Thus, using FIG. 2A for comparison, FIG. 3A exemplifies the operation of the circuit 300 in a high ambient lighted environment, i.e., showing that the signal strength, though reduced, is still well within the operating tolerance of the infrared element 301 design operating range.

Thus, the present invention provides an infrared detector 300 employing infrared element control circuit wherein the effect of external light on the sensitivity of the infrared element 301 itself is reduced by approximately 80% by a simple, but elegant, economical use of a biased feedback loop 303.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

What is claimed is:

1. An infrared signal detector comprising:

an infrared sensor;

a power source for activating the sensor, including a bias resistor; and a feedback loop coupled to said sensor, including a feedback bias resistor wherein the feedback bias resistor has a resistance approximately 10000 times greater than said bias resistor.

2. The infrared signal detector as set forth in claim 1 in a microprocessor controlled apparatus wherein the detector is configured for receiving digital data as an input to said apparatus.

3. An apparatus having an infrared input port wherein the port further comprises an infrared signal detector including an infrared sensor, a power source for activating the sensor, including a bias resistor, and a feedback loop coupled to said sensor, the loop including a feedback bias resistor wherein the feedback bias resistor has a resistance approximately 10000 times greater than said bias resistor.

4. The infrared input port as set forth in claim 3 wherein the apparatus is a computing device.

5. The infrared input port as set forth in claim 3 wherein the apparatus is a computer peripheral.

6. The infrared input port as set forth in claim 3 wherein the apparatus is a test instrument.

7. The infrared input port as set forth in claim 3 wherein the apparatus is a personal digital assistant type device.

8. A method for controlling sensitivity of an infrared sensor, said sensor including a biased power source, the method comprising:

biasing the power source with a first resistor having a predetermined first resistance; and providing feedback to said sensor via a second resistor having a predetermined second resistance wherein a ratio second resistance: first resistance is approximately 10000:1.

\* \* \* \* \*